of movement. The
United States Patent [19]
Klinner et al.

[11] 4,172,414
[45] Oct. 30, 1979

[54] COMPRESSION APPARATUS

[75] Inventors: Wilfred E. Klinner, Bletchley; Robert V. Chaplin, Lancaster; David J. Frost, North Brickhill, all of England

[73] Assignee: National Research Development Corporation, London, England

[21] Appl. No.: 822,213

[22] Filed: Aug. 5, 1977

[30] Foreign Application Priority Data

Aug. 5, 1976 [GB] United Kingdom ............... 32687/76
Nov. 22, 1976 [GB] United Kingdom ............... 48608/76

[51] Int. Cl.² .................... B65B 13/00; B30B 15/14
[52] U.S. Cl. ........................................ 100/4; 100/45; 100/49; 100/50; 100/53; 100/98 R; 100/100; 100/139; 100/215; 100/218; 100/250; 56/341
[58] Field of Search ............... 100/4, 19 R, 50, 53, 100/98 R, 100, 139, 140, 215, 218, 250, 295, 7, 45, 49, 245, 142, 189

[56] References Cited

U.S. PATENT DOCUMENTS

| 3,068,784 | 12/1962 | McDuffie | 100/142 |
| 3,145,647 | 8/1964 | Dinkov | 100/295 X |
| 3,426,672 | 2/1969 | Nolt | 100/45 X |
| 3,728,849 | 4/1973 | Lundahl | 100/295 UX |
| 3,911,807 | 10/1975 | Birnbaum | 100/218 X |
| 4,034,543 | 7/1977 | Voth | 100/50 X |

FOREIGN PATENT DOCUMENTS

| 19523 | 4/1929 | Australia | 100/250 |
| 613390 | 11/1948 | United Kingdom | 56/341 |
| 685224 | 12/1952 | United Kingdom | 56/341 |
| 773230 | 4/1957 | United Kingdom | 100/189 |
| 882242 | 11/1961 | United Kingdom | 56/341 |
| 937875 | 9/1963 | United Kingdom | 56/341 |
| 943705 | 12/1963 | United Kingdom | 100/215 |
| 951698 | 3/1964 | United Kingdom | 100/215 |
| 964071 | 7/1964 | United Kingdom | 100/189 |
| 1381515 | 1/1975 | United Kingdom | 100/215 |

*Primary Examiner*—Billy J. Wilhite
*Attorney, Agent, or Firm*—Oblon, Fisher, Spivak, McClelland & Maier

[57] ABSTRACT

Compression apparatus including a press framework defining a compression region for housing material such as straw to be compressed, one or more compression elements such as two opposed arrays of compression teeth for compressing material by movement along the compression region, and a drive mechanism for moving the compression teeth in a cycle of movement. The cycle includes the compression teeth entering into the compression region, moving along the compression region along a substantially rectilinear path to compress material in the compression region, and returning to the position occupied at the beginning of the cycle, the compression teeth being at least partially removed from the compression region during the return movement. Preferably the material to be compressed is preformed into a column of material fed continuously into the compression region, the compression teeth being arranged to sever a portion of the column, to compress the portion, and to execute the return movement by moving past the preformed column while it continues to move into the compression region.

24 Claims, 14 Drawing Figures

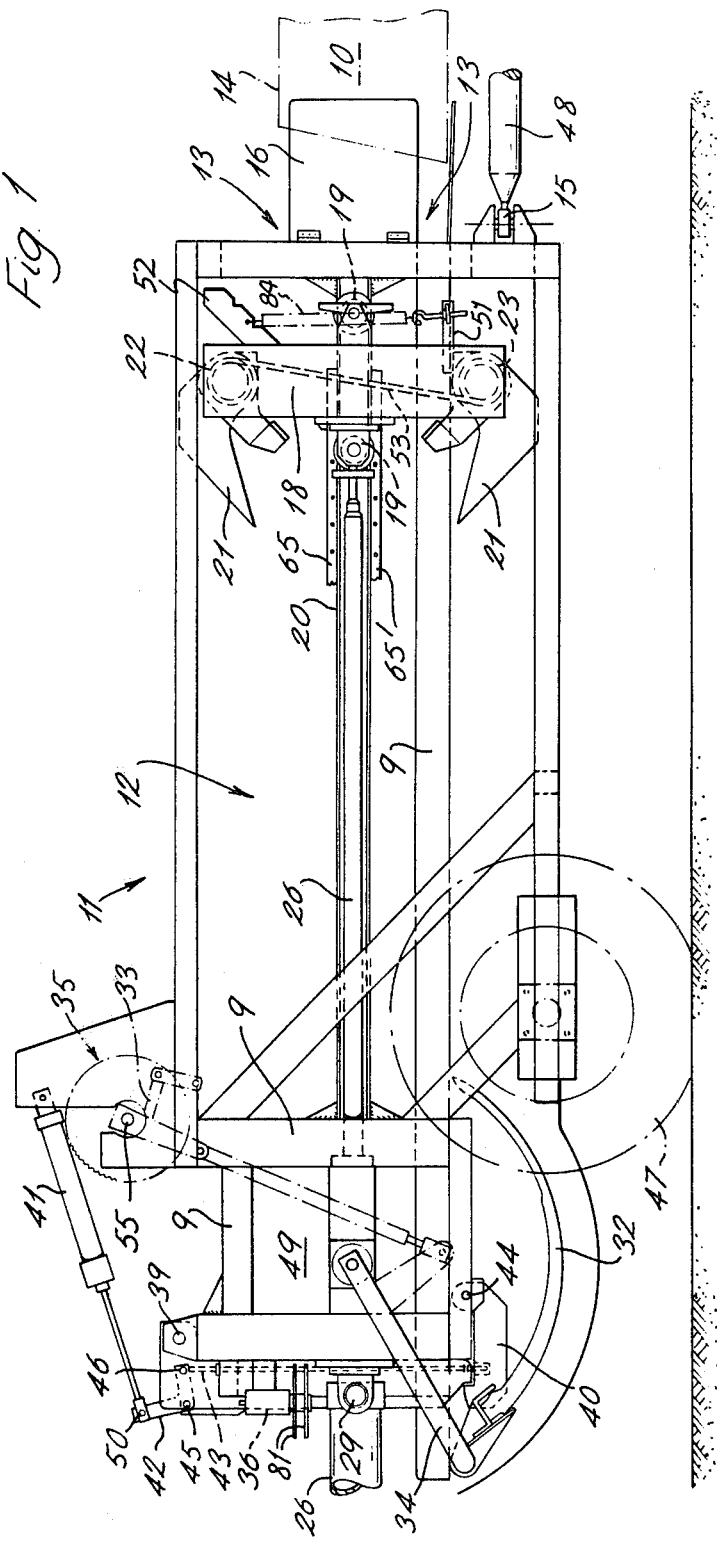

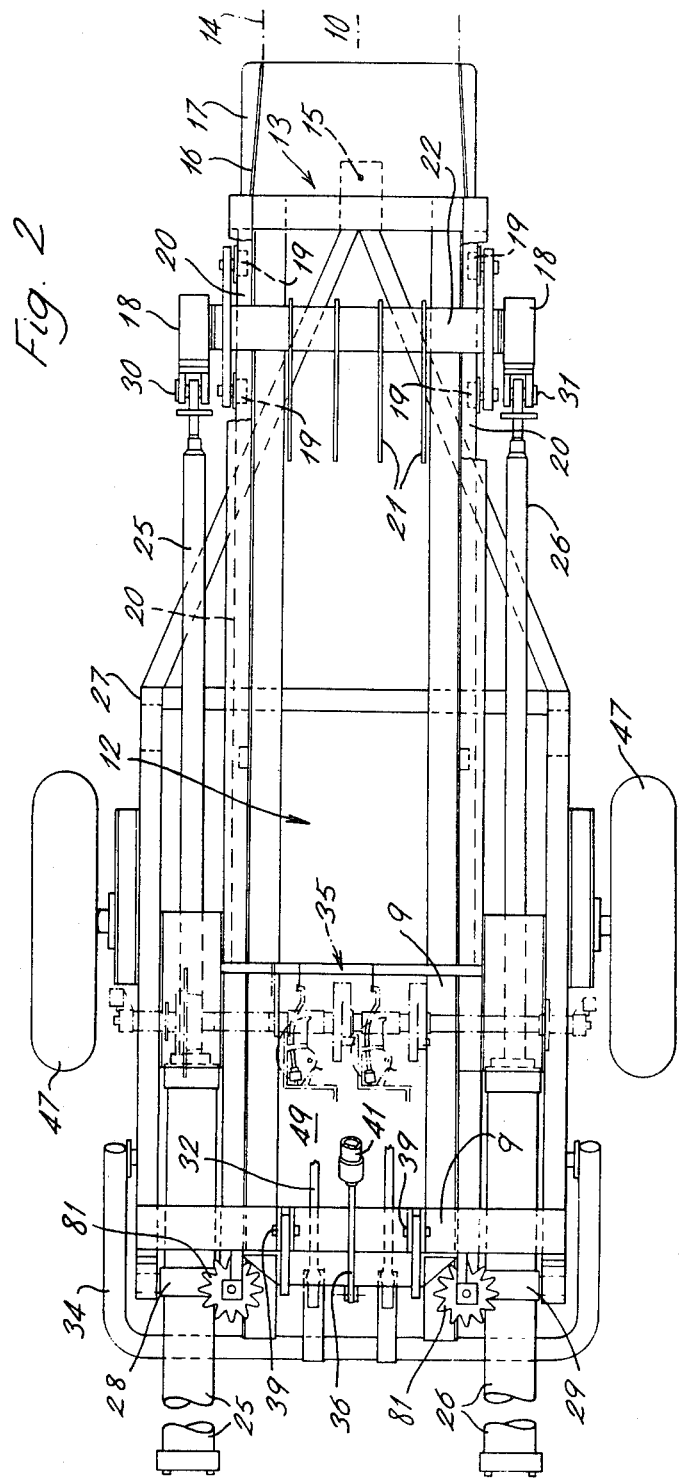

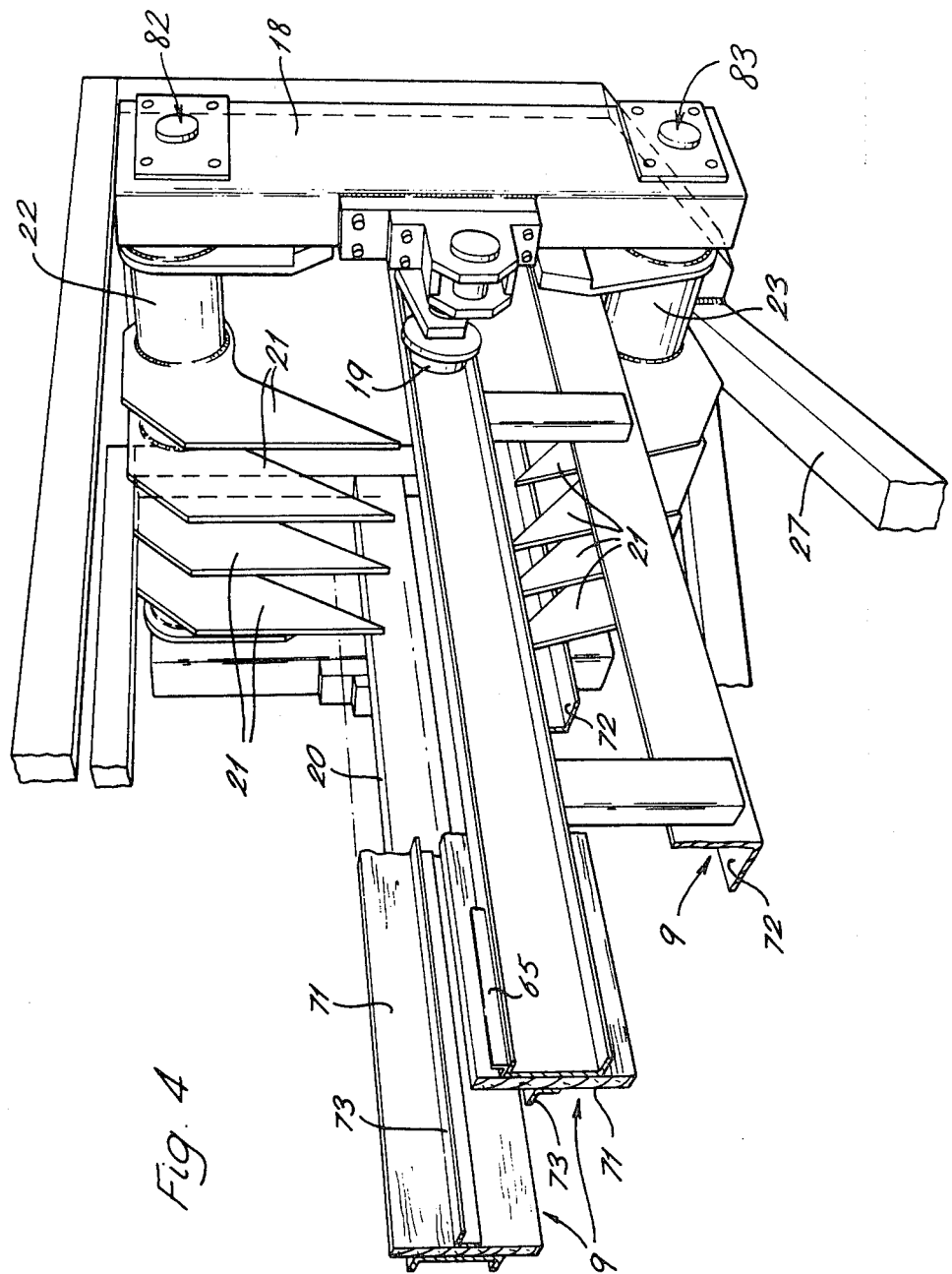

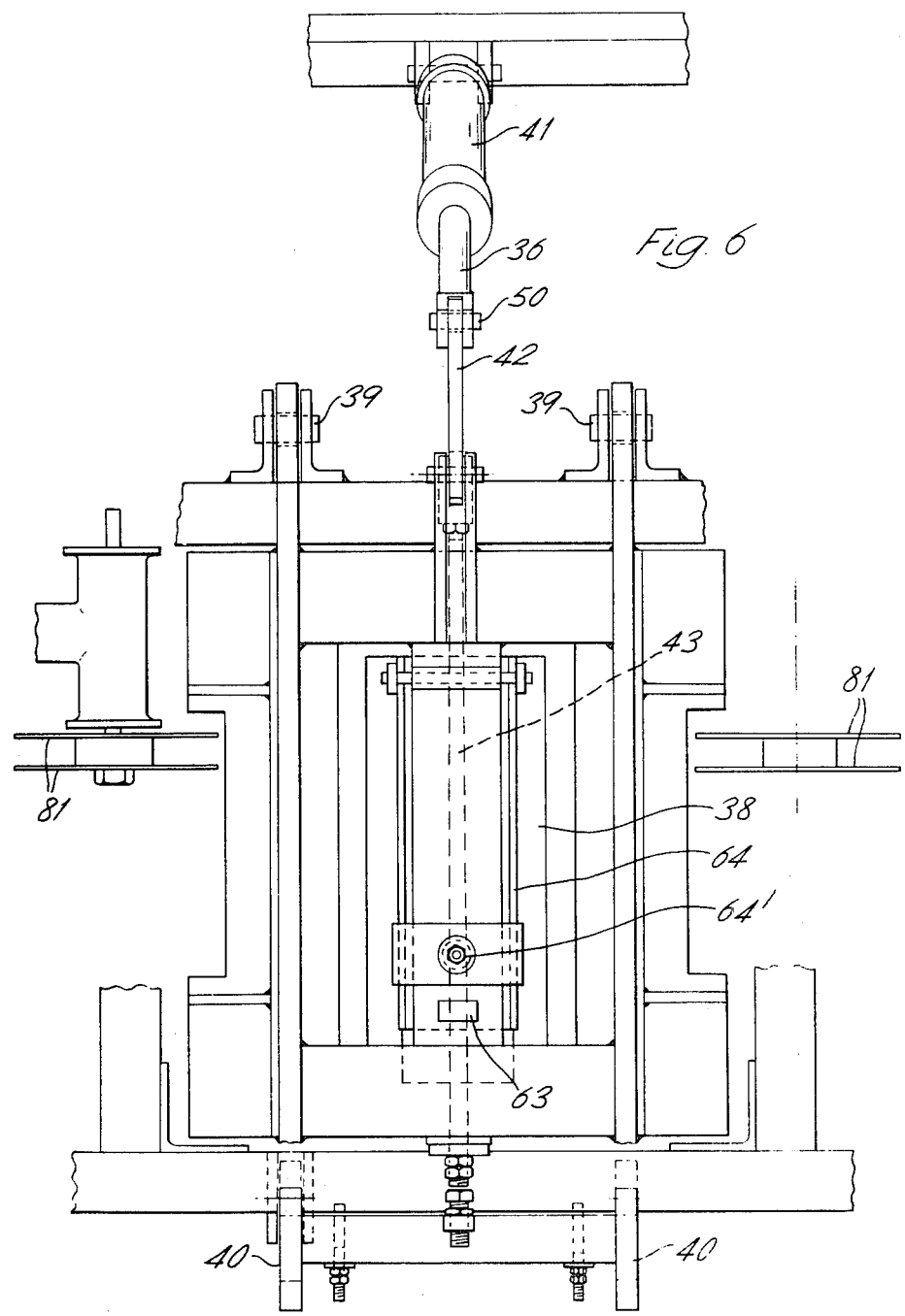

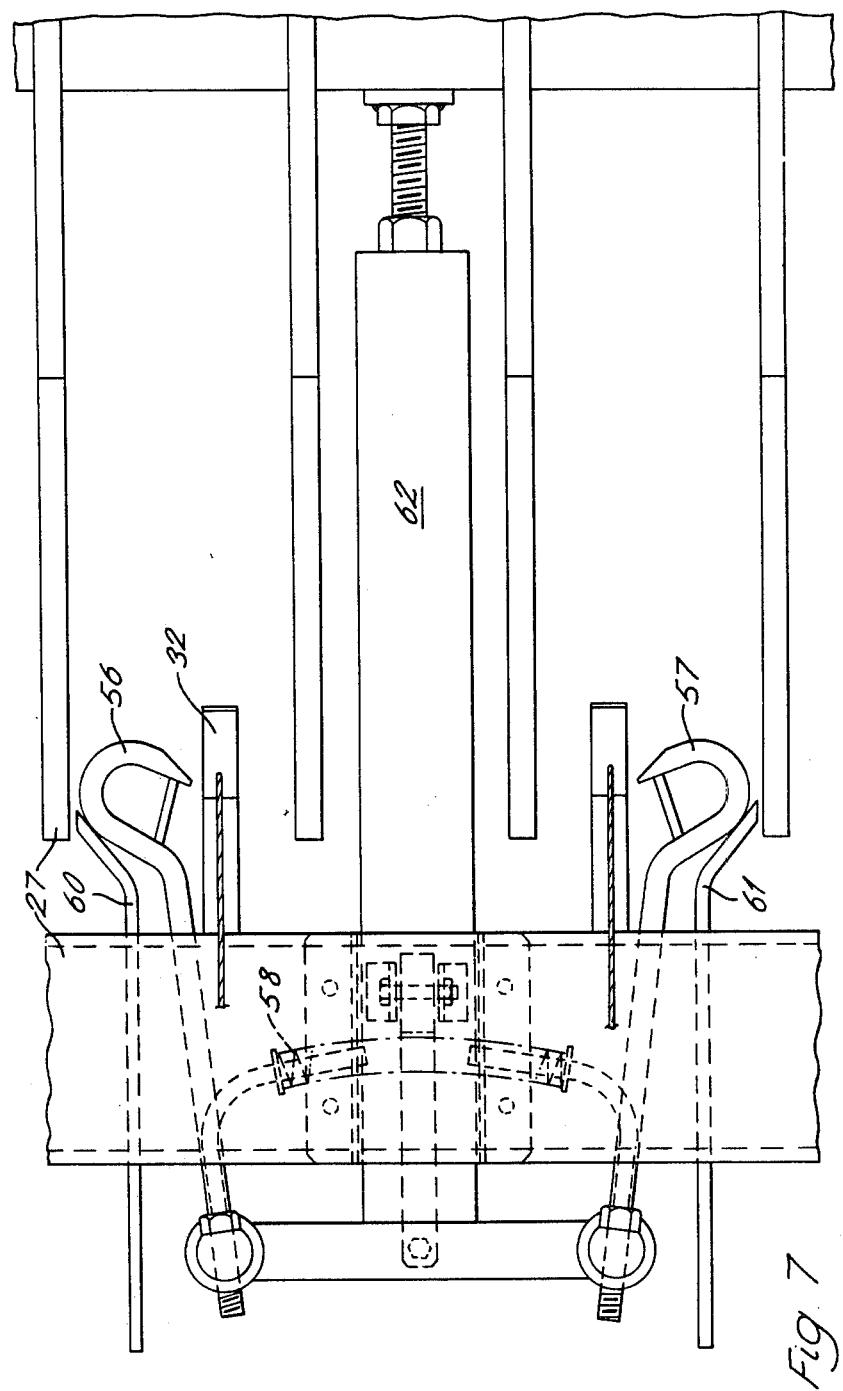

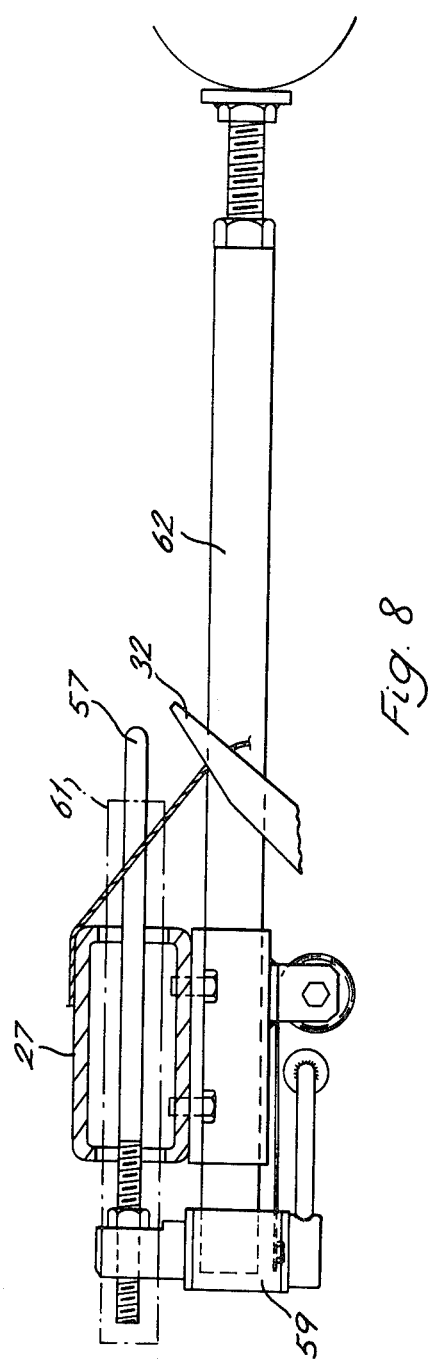

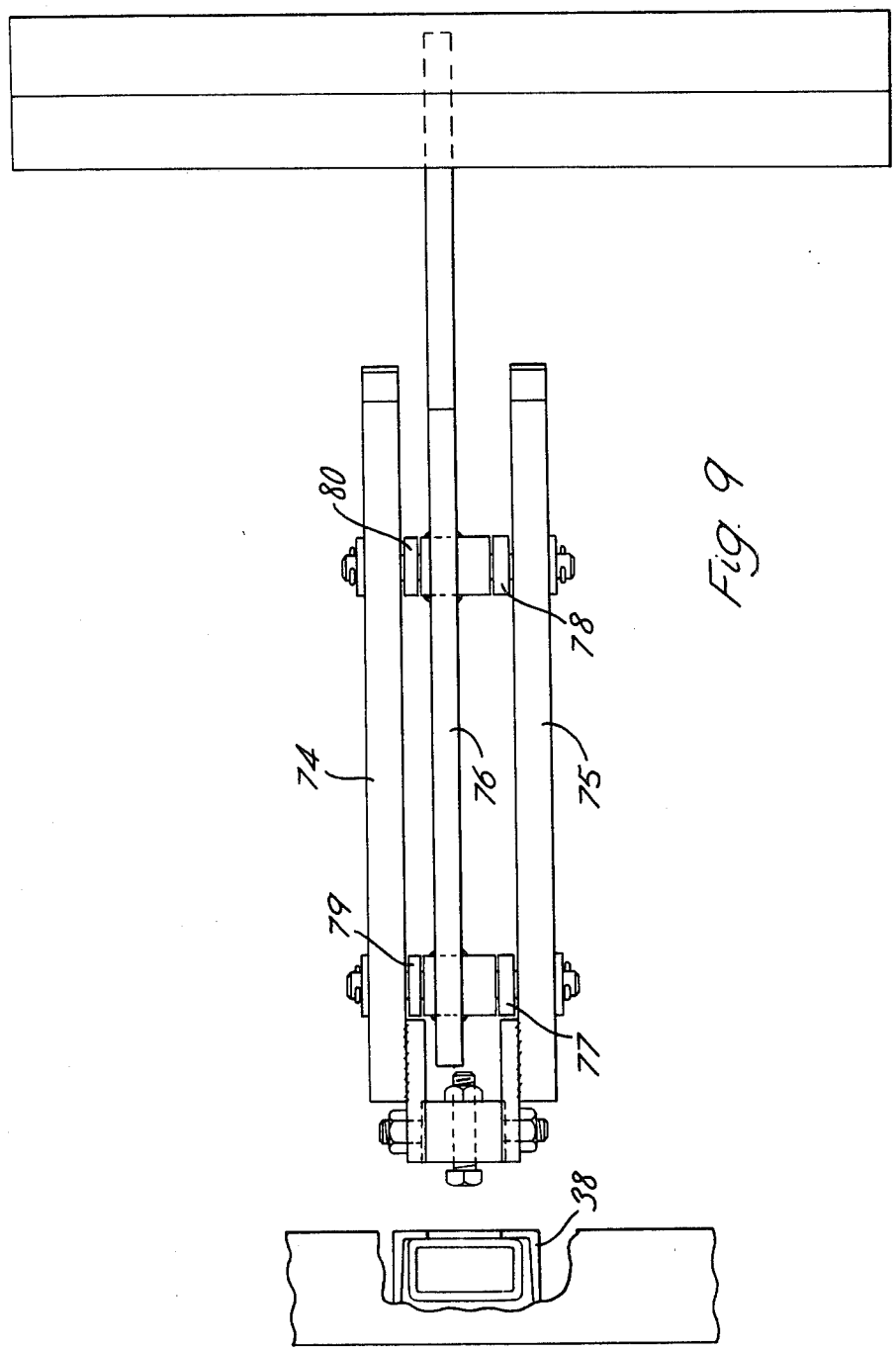

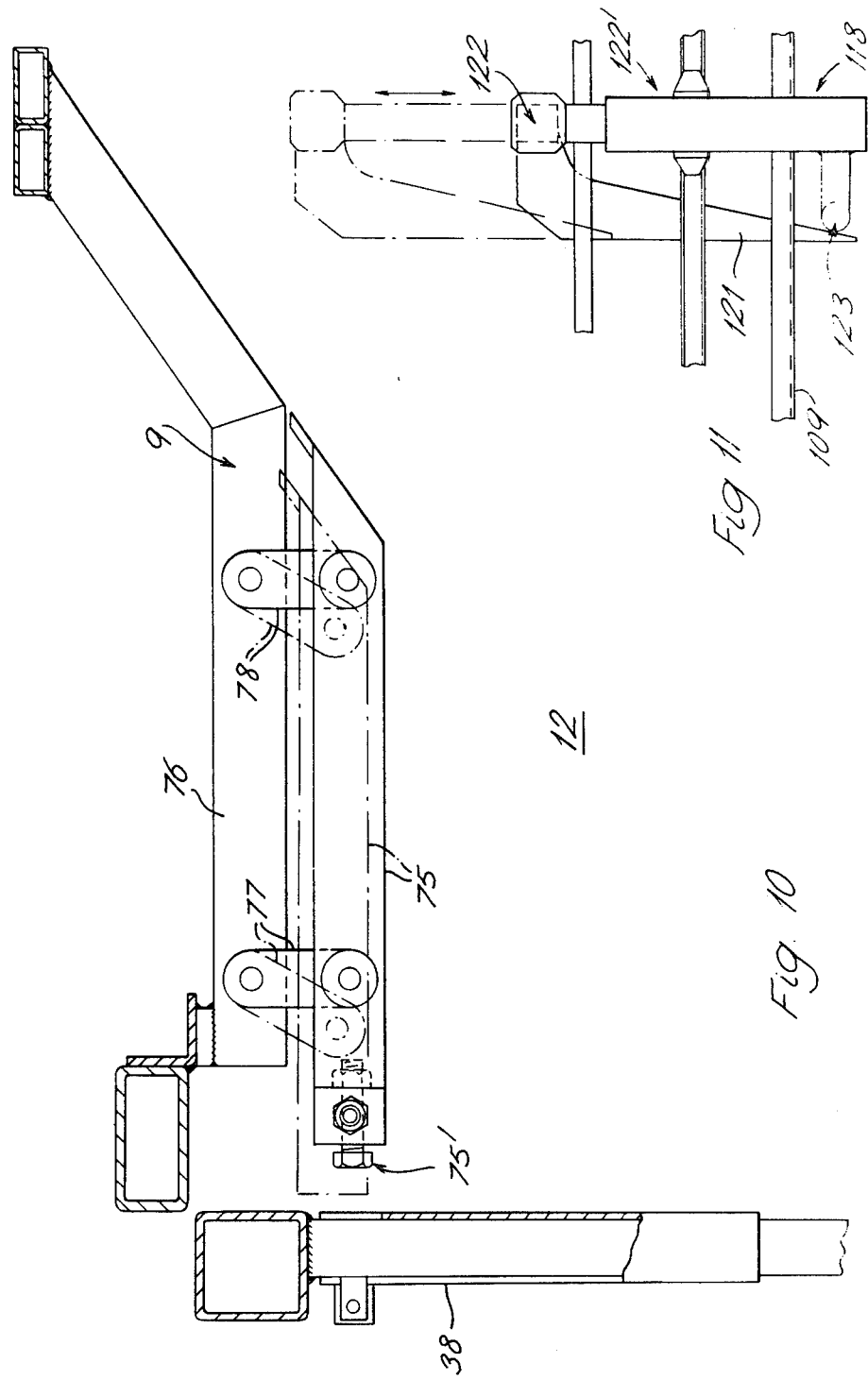

COMPRESSION APPARATUS

BACKGROUND OF THE INVENTION

1. Field of the Invention

The present invention relates to apparatus for compressing material, for example straw or other crop material.

2. Description of the Prior Art

In a known baling machine for example for compressing and baling straw, a pick up rotor on a tractor drawn machine collects straw from the ground and the straw is transferred sideways across the machine by, for example, an auger into the input opening of a longitudinal compression chamber positioned along the length of the machine. The straw is periodically compressed by a reciprocating compression piston driven along the compression chamber, straw being fed into the chamber transversely, at right angles to the direction of travel of the piston. There is no end door to the compression chamber for the compression piston to bear against, the compression of straw taking place instead by virtue of the resistance to the movement of the straw along the compression chamber. The walls of the compression chamber are slightly converging in the direction of compression, or alternatively the side walls of the compression chamber may be parallel and there may be provided compression plates at the top and bottom of the chamber which are arranged to converge towards each other. Periodically, measured lengths of the column of compressed straw are tied with two or more strands of twine to form bales.

The form of compressor baler described above has a number of limitations. For example the density of compression which can be achieved is relatively low due to the fact that there is no end plate for the compression piston to bear against. Also it is difficult to obtain uniform compression due to variations in the moisture or other qualities of the straw and hence variations in the friction between the straw and the walls resulting in varying resistance offered to the compression piston.

Furthermore, it is not possible to have a truly continuous input of material for compression because the material is fed into the side of the compression chamber at right angles to the direction of compression of the piston. The input cannot be truly continuous because no input can pass into the chamber during a compression stroke.

According to the present invention there is provided a compression apparatus including a press framework defining a compression region for housing material to be compressed, one or more compression elements for compressing material by movement along the compression region, and a drive mechanism for moving the compression element or elements in a cycle of movement having one stage in which the or each element enters into the compression region, a further stage in which the or each compression element is moved along the compression region along a substantially rectilinear path to compress material in the compression region, and a yet further stage in which the or each compression element is returned to the position it occupied at the beginning of the first mentioned stage, the compression element or elements being at least partially removed from the compression region during the return movement in the last mentioned stage.

By the term press framework is meant a structure which houses the material during compression and restrains the material sufficiently to allow compression to take place during movement of the compression elements along the framework. Thus the framework may consist of a relatively open framework having floor members sufficient to support the material during compression, and side members sufficient to restrain the material during compression. In some examples an upper part of the framework may be open allowing some upward movement of the material during compression.

However it will be appreciated that in some arrangements the press framework may comprise a bale chamber or conduit having one or more continuous walls. Conveniently one or more such walls may have slots suitable to accommodate the entry of the compression element or elements.

The press framework may have an input opening for receiving material to be compressed and at the other end thereof an end stop member positioned for the compression element or elements to compress the material against, the end stop member being openable or removable after compression of the material to allow removal of the compressed material from the compression region.

The press framework may have at one end an input opening for receiving material to be compressed, and the input opening may be arranged to receive material into the compression region by movement of the material along the same general direction as the movement of the compression element or elements during compression of the material.

Preferably there are provided mechanism for shaping the material to be compressed into a preformed column of material and for feeding the preformed column of material into the compression region, and the compression element or elements may be arranged during the last mentioned stage to execute the return movement by moving past the preformed column of material during its movement into the compression region.

Furthermore there may be provided a mechanism for shaping the material to be compressed into a preformed column of material and for feeding continuously the preformed column of material into the compression region, the drive mechanism being arranged to move the compression element or elements into a position between a main body of the column of material entering into the compression region and a portion of the column of material within the compression region, the compression element or elements being arranged during the further stage to compress the portion of material in the compression region while the main body of material continues to enter the compression region.

In some preferred arrangements of the invention the compression element or elements are adapted to sever the portion of material to be compressed from the main body of material.

The drive mechanism may include a mounting member for moving the compression element or elements into and out of the compression region by a movement of the compression element or elements transverse to the direction of movement of the compression element or elements during the further stage when the material is being compressed in the compression region. The transverse movement may be in a direction substantially at right angles to the direction of movement of the compression element or elements during the further stage of the cycle when the material is being compressed.

Preferably, the drive mechanism includes a pivotal mounting assembly for moving the compression element or elements into and out of the compression region by a pivotal movement of the compression element or elements.

Conveniently the compression element or elements are mounted by a mounting assembly positioned externally of the compression region.

Conveniently the end stop member comprises an end door pivoted along a horizontal axis substantially at the level of the roof of the press framework and secured in place by a catch mechanism substantially at the level of the floor of the press framework. Alternatively the end stop member may comprise two half width doors pivoted horizontally top and bottom, or two vertical doors pivoted at the sides thereof.

In some arrangements it may be preferable for the drive mechanism to be coupled directly between the end stop member and the compression element or elements during compression of the material. In this way the compressive forces can be applied directly between the end stop member and the compression element or elements and if desired the end stop member may be allowed some degree of movement relative to the rest of the press framework. In some cases the end door or doors can conveniently be coupled directly to the drive machanism in such a manner that the doors are secured in a closed position during compression by the forces exerted on the compression elements to effect the compression.

There may be provided a pressure sensitive switch in the region of the end door of the press framework which is sensitive to contact by the material to be compressed, the movement of the compression elements being initiated in response to a signal from the pressure sensitive switch.

There may also be provided in the region of the end of the press framework remote from the input opening one or more roof members in the upper part of the compression region which is or are movable between a lower and an upper position, the or each roof member being arranged to be in the lower position when the door is shut, and to be movable to the upper position when the door is opened after complete compression of material so as to allow partial expansion of the compressed material to facilitate ejection of the compressed bale from the compression region.

The compression element or elements may be mounted on a subframe positioned externally of the compression region, the subframe being mounted for substantially rectilinear movement relative to the compression region to effect the said movement of the compression element or elements along the compression region during the further stage of the cycle. The subframe may comprise a yoke extending around the compression region.

Conveniently the subframe may be mounted on tracks running along opposed sides of the compression region on the outside thereof. The drive mechanism may include a pair of hydraulic rams positioned one on each side of the compression region and coupled between the subframe and an end door or other end stop mechanism against which the material is to be compressed. As has been mentioned before the drive mechanism may be coupled indirectly to the end door (or other stop member) by being coupled to the press framework to which in turn the end door (or other stop member) is coupled. Alternatively the drive mechanism may be coupled directly to the end door (or other stop member) in such a manner that the tension forces applied to compress the material act directly between the compression elements and the end door (or other stop member). The coupling may be arranged in such a manner that the forces applied to compress the material also act to secure the end door (or other end stop member) in a closed position.

There may be provided control mechanism along the press framework which engage the compression element or elements on advance of the subframe during the further stage of the cycle, the engagement of the compression element or elements with the control mechanism being such as to force the compression element or elements inwardly towards the compression region.

In embodiments of the invention it is preferred that the drive mechanism includes support member on each of two opposed sides of the compression region for applying force to the compression element or elements for driving the element or elements along the compression region during the compression of material. The support member on each side of the compression region may have the function of driving one or more compression elements which span the compression region between the two opposed sides, or may have the function of driving two oppositely facing arrays of cantilevered compression elements.

Thus in some preferred arrangements at least one compression element is positioned on each of two opposed sides of the compression region. Preferably a plurality of compression elements is provided, arranged in two oppositely facing arrays extending into the compression region during the further stage of the cycle.

It will be appreciated that the cycle of movement of the compression element or elements may include further stages in addition to the three stages set out above. For example the drive mechanism may move the compression element or elements in a preliminary stage so that the compression element or elements being to move along a general longitudinal direction of the press framework before the one stage in which the or each element enters into the compression region.

The compression element or elements may during the last mentioned stage of the cycle be totally withdrawn from the compression region by action of the drive mechanism, or the compression element or elements may be moved along the return movement by the drive means and may be removed from the compression region merely by the effect of further material to be compressed entering the compression region while the compression elements are on the return stroke so that the compression element or elements are forced outwardly from the compression region by the incoming material to be compressed. In such a case the compression element or elements may be only partially withdrawn from the compression region and may to some small extent extend into the incoming crop during the relative movement between the crop and the compression elements on their return stroke.

SUMMARY OF THE INVENTION

The apparatus of the present invention may be particularly adapted for compression of straw or other crop material and may be mounted on a framework adapted for mounting on the rear of the compression chamber of a conventional bale compressor.

Where there is provided a mechanism for shaping the material into a preformed column of material, there may be provided a pressure-responsive trigger mechanism positioned to be actuated by the advancing preformed column of material and coupled to the drive mechanism for actuating the drive mechanism to commence the cycle of movement when a required amount of the material has entered the compression region.

The pressure-responsive trigger mechanism may be adjustable to respond to different pressures exerted by the advancing column of material in such a manner as to allow variation of the density of the material after compression by the compression elements.

Where there are provided end stop members as set out hereinbefore, the pressure-responsive mechanism may be coupled to the end stop members.

As has been mentioned, there are preferably provided mechanism for shaping material into a preformed column of material before it is fed into the press framework of the main compression apparatus. This shaping mechanism may itself comprise a compression apparatus embodying the present invention, but of a generally lighter construction than the main compression apparatus. This preliminary compression apparatus may conveniently accept material (to be lightly compressed into the preformed column) as unformed material such as loose straw or hay picked up from the field.

According to the present invention in another aspect there is provided compression apparatus comprising a press framework defining a compression region for housing material to be compressed, one or more compression elements for compressing material by movement along the compression region, and a drive mechanism for moving the compression element or elements in a cycle of movement having one stage in which the or each element enters into the compression region, a further stage in which the or each compression element is moved along the compression region to compress material in the compression region, and a yet further stage in which the or each compression element is returned to the position it occupied at the beginning of the first mentioned stage, the compression element or elements being at least partially removed from the compression region during the return movement in the last mentioned stage, and the drive mechanism including support member on each of two opposed sides of the compression region for applying force to the compression element or elements for driving the element or elements along the compression region during the compression of the material.

According to the present invention in a further aspect there is provided compression apparatus comprising a press framework defining a compression region for housing material to be compressed, one or more compression elements for compressing material by movement along the compression region, a drive mechanism for moving the compression element or elements in a cycle of movement having one stage in which the or each element enters into the compression region, a further stage in which the or each compression element is moved along the compression region to compress material in the compression region, and a yet further stage in which the or each compression element is returned to the position it occupied at the beginning of the first mentioned stage, and a mechanism for shaping the material to be compressed into a preformed column of material and for feeding the preformed column of material into the compression region, the compression element or elements being arranged during the last mentioned stage to execute the return movement by moving past the said preformed column of material during its movement into the compressed region.

According to the present invention in a yet further aspect there is provided compression apparatus comprising a press framework defining a compression region for housing material to be compressed, one or more compression elements for compressing material by movement along the compression region, drive mechanism for moving the compression element or elements in a cycle of movement having one stage in which the or each element enters into the compression region, a further stage in which the or each compression element is moved along the compression region to compress material in the compression region, and a yet further stage in which the or each compression element is returned to the position it occupied at the beginning of the first mentioned stage, and a mechanism for shaping the material to be compressed into a preformed column of material and for feeding continuously the preformed column of material into the compression region, the drive mechanism being arranged to move the or each compression element into a position between a main body of the column of material entering into the compression region and a portion of the column of material within the compression region, the compression element or elements being arranged, during the further stage to compress the portion of material in the compression region while the main body of material continues to enter the compression region.

It is an advantage of the various preferred arrangements set out hereinbefore that the continuous column of precompressed straw may continue to be fed into the compression chamber while the compressing phase is taking place. In another known apparatus for compressing to a higher density precompressed straw coming from a conventional baler, it has been proposed to take the previously compressed and tied bale, optionally to cut or untie the bale, to place the bale in a compression chamber having an internal piston and then to recompress the bale to increase the density. This has a number of disadvantages. For example firstly the secondary compression is not a continuous process in that the machine cannot easily be directly coupled to a conventional baler. In the present invention however it is possible to arrange for the output from a conventional baler to be fed directly and continuously into the compression chamber. Secondly the bales formed by a secondary compression in known apparatuses have the disadvantage that they are smaller, usually half the length of conventional bales, so that they cannot conveniently be handled by existing bale handling equipment. The present invention allows high density bales to be produced having substantially the same dimensions as conventional bales (thus allowing conventional bale handling equipment to be used) or in any other dimensions which are found desirable. Finally an advantage of the present invention is that it is not necessary to go through the step of tying conventional bales and retying them again after further compression. In embodiments of the present invention it is possible to feed precompressed straw directly into the compression chamber without tying until the further compression has taken place.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein:

FIG. 1 is a side view of a compression apparatus embodying the invention for use in compression of straw or other crop material;

FIG. 2 is a plan view of the compression apparatus shown in FIG. 1;

FIG. 4 is a perspective view showing compression elements present in the compression apparatus of FIGS. 1 to 3;

FIG. 6 is an end view of the door shown in FIG. 5;

FIGS. 7 and 8 are plan and side views, respectively, of a device for introducing an extra loop of slack into the twine of a bale tying mechanism shown in FIGS. 1 and 2;

FIGS. 9 and 10 are plan and side views, respectively, of roof members of a press framework shown in FIGS. 1, 2, 3 and 4; and FIG. 11 shows in diagrammatic form a modification of part of the apparatus shown in the preceding Figures.

DETAILED DESCRIPTION OF THE PREFERRED EMBODIMENTS

Figure 3:
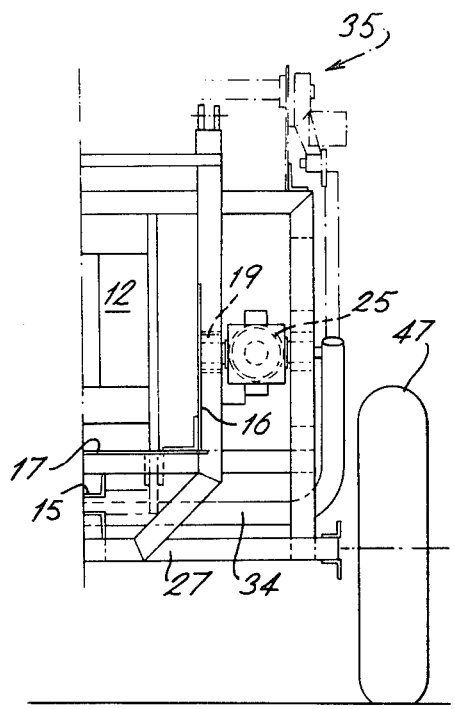
FIG. 3 shows a half-view along the longitudinal axis of the compression apparatus of FIG. 1.
Figure 3A:
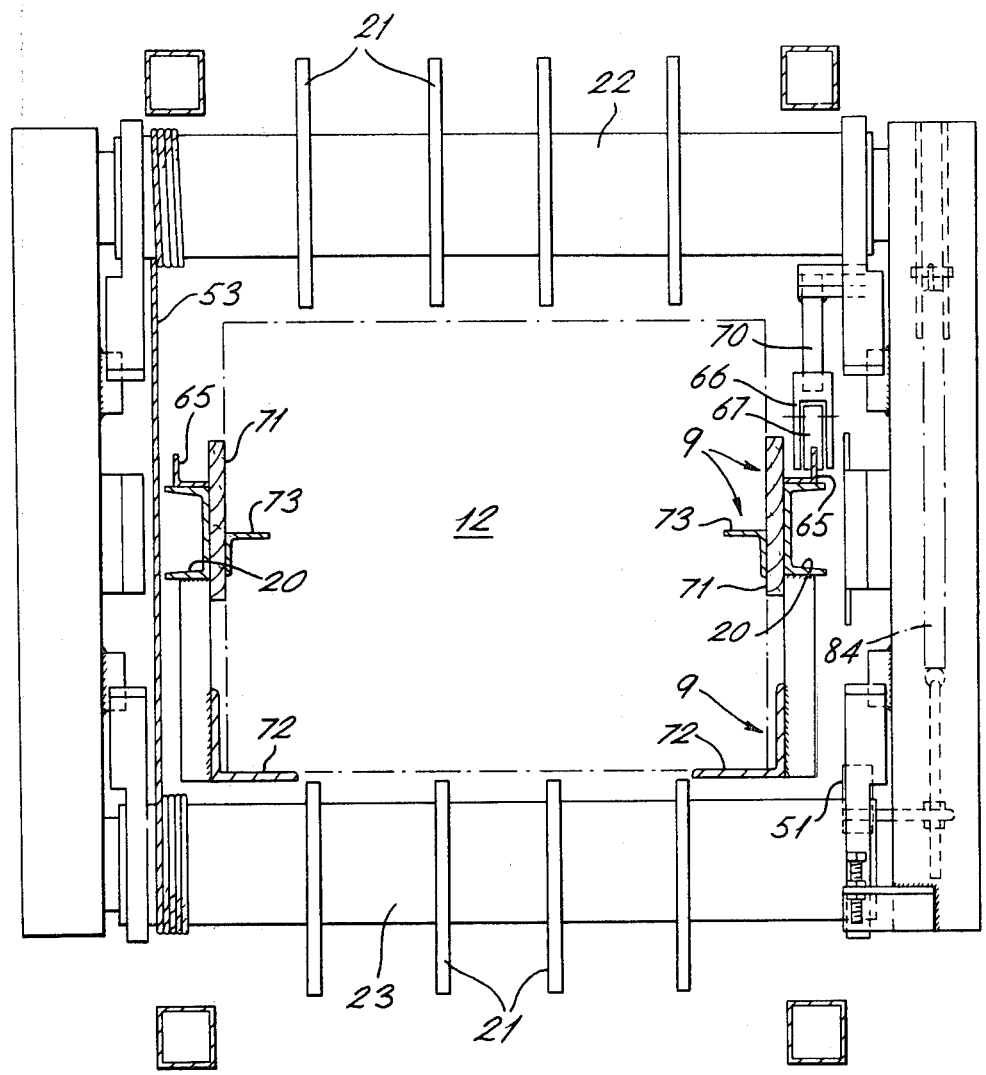
FIG. 3A is an end view of the compression apparatus shown in FIGS. 1 and 2.

Referring firstly in particular to FIGS. 1, 2 and 3, compression apparatus 11 comprises a press framework 9 defining a compression region 12 for housing straw or other crop to be compressed. The press framework 9 has an input opening 13 at one end for receiving precompressed straw from a conventional baler compressor 10. The end of the bale chamber of the conventional baler 10 is indicated at 14. The apparatus 11 is pivotally linked to the baler 10 by a drawbar 48 and pivotal mounting 15 so that angular movement between the baler 10 and the compression apparatus 11 is allowed temporarily up to 90° on either side of the centre line of the apparatus 11. The whole apparatus 11 is mounted on a main frame 27 which in turn is carried on land wheels 47. In the embodiment shown the main frame 27 is towed behind the conventional baler 10 by the drawbar 48. The precompressed straw from the baler 10 is guided into the compression chamber 12 by inclined vertical doors 16 and horizontal doors 17.

Mounted externally of the compression region 12 is a subframe 18 in the form of a yoke encompassing the compression region 12. The subframe 18 is mounted on two pairs of guide wheels 19 on each side of the press framework 9 the guide wheels 19 being arranged to run in guide tracks 20 allowing longitudinal motion of the subframe 18 along the press framework 9.

Mounted on the subframe 18 are a plurality of compression elements consisting of compression teeth 21. Four of the teeth 21 are positioned in a parallel array mounted on an upper cross member 22 of the subframe 18, and four of the teeth 21 are positioned in a parallel array mounted on a lower cross member 23 of the subframe 18. The teeth 21 of each array are fixed relative to each other and mounted for rotation about a horizontal shaft common to the array. Thus the upper cross member 22 comprises a sleeve rotatable on an upper cross shaft 82 and the lower cross member 23 comprises a sleeve rotatable on a lower cross shaft 83 (FIG. 4).

External of the press framework 9 there are provided two hydraulic rams 25 and 26 positioned one on each side of the press framework 9 and constituting part of drive mechanism for moving the subframe 18 along the press framework 9. The rams 25 and 26 are secured to the main frame 27 by means of pivotal ram mountings 28 and 29, and are coupled to the subframe 18 by pivotal ram mountings 30 and 31.

The detailed operation of the apparatus will be described hereinafter, but a brief outline of the operation will be described at this stage to facilitate understanding of descriptive details referred to below. The broad steps of operation are that a precompressed column of straw is fed into the compression region 12 through the opening 15 until the region 12 is full of straw. The subframe 18 is then propelled to the left in FIGS. 1 and 2 and the teeth 21 are urged inwardly into the straw column to tear off and compress a portion of the column of straw. The compressed bale is then tied, an end door 38 (FIG. 5) is opened and the tied bale is ejected through an end opening remote from the inlet opening 13. The subframe 18 is then returned to the right in FIG. 1 and the end door 38 is closed to allow a fresh cycle to begin.

Referring to FIG. 1, on each side of the press framework 9 there is upstanding from the guide tracks 20 a rail 65 on which is mounted a pawl 66 pivotally mounted on a bracket 67 which itself is fixedly mounted on the rail 65. The bracket 67 is mounted on the rail 65 by bolts or pins passing through apertures in the bracket 67 and the rail 65. There are provided along the rail 65 a plurality of apertures 68 allowing the position of the bracket 67 to be varied. The pawl 66 is spring loaded into an upstanding position (as shown in full lines) by a tension spring 69, but is pivotable to a lower position (shown in broken lines) by extension of the spring 69.

On each side of the carriage 18 there is mounted a trip claw 70 bolted to the cross member 22 which rotates about the shaft 82 with the upper teeth 21. The claw 70 is so positioned that on the rearward stroke of the carriage 18, the claw 70 meets the pawl 66 in its upstanding position. The pawl 66 is so positioned and so shaped that on the return stroke of the carriage 18, the claw 70 rides over the pawl 66 by rotation of the pawl 66 to the lower position against the spring 69. Tripping of the claw 70 on the pawl 66 during the rearward stroke of the carriage 18 rotates the upper teeth 21 in an counterclockwise direction in FIG. 1.

Figure 1A:
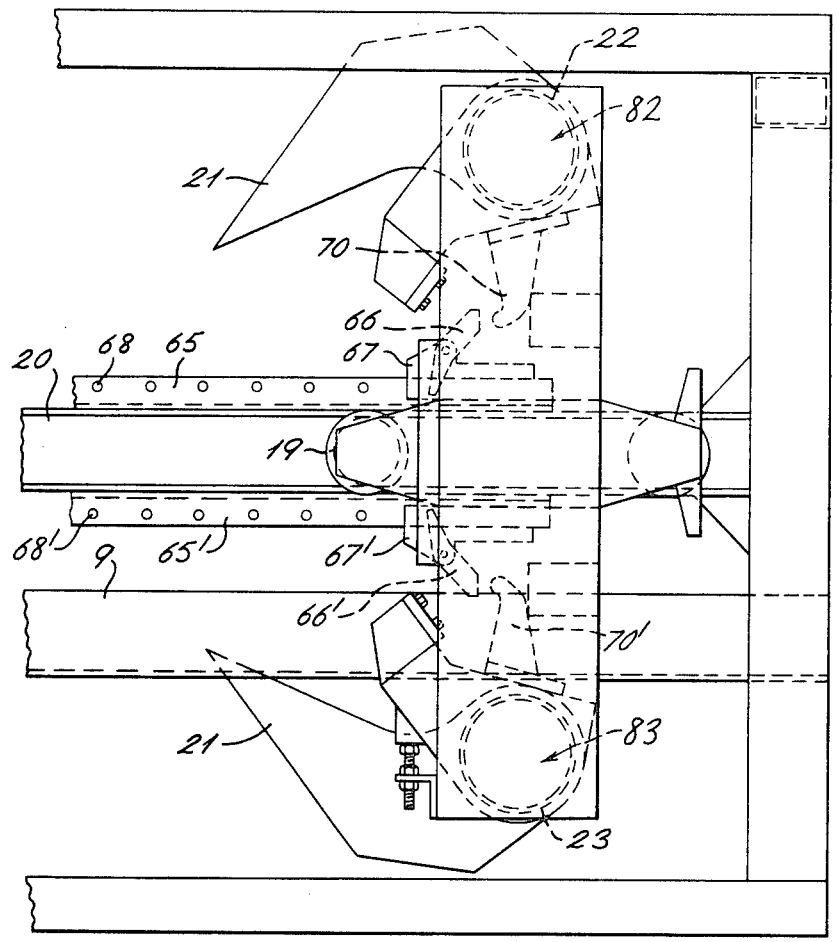
FIG. 1A and 1B show details of the elements of the compression apparatus of FIG. 1.
Figure 1B:
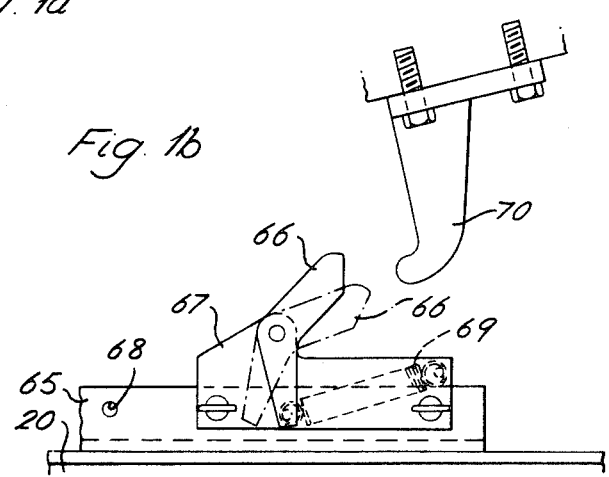

As shown in FIG. 1(a) the pawl and claw arrangement shown in FIG. 1(b) is duplicated on mountings for the lower compression teeth 21 so that both upper and lower teeth 21 are positively driven into the straw column. All the elements 65 to 70 for the upper teeth 21 are duplicated by corresponding elements 65' to 70' for the lower teeth 21.

On the return stroke of the subframe 18, the lower teeth 21 fall clear of the incoming straw column by gravity, and the upper teeth 21 ride over the incoming straw column by pivotting upwardly. Thus the upper teeth are removed from the compression region on the return stroke by the effect of the incoming straw itself.

In a modification, the teeth 21 may be spring loaded in such a sense that the teeth 21 are biassed outwardly from the compression region 12. The spring loading may be effected for example by a tension spring 84 coupled between a bracket 51 rotatable with the teeth 21 on the lower member 23, and a bracket 52 fixed relative to the press framework 9. The upper and lower teeth 21 may be coupled together by a wire rope 53 wound in opposite senses around the upper and lower rotary cross members 22 and 23. The rope then ensures that the upper and lower teeth 21 rotate in unison, although in opposite senses, and also biasses the upper teeth 21 outwardly by virtue of the effect on the lower teeth 21 of the said tension spring.

There is also provided on the main frame 27 a conventional bale tying mechanism comprising two twine tying needles 32 carried by a needle yoke 34, and a drive rod 54 coupled between the needle yoke 34 and a drive arm 33 for driving the needle 32. The drive arm 33 is driven conventionally by a continuously rotating shaft 55 to which it is coupled when triggered at the end of a compression stroke as will be described hereinafter. A conventional knotting mechanism is provided and is indicated generally at 35. The purpose of the bale tying mechanism is to tie the compressed material after it has been compressed (as will be described hereinafter) into an end portion of the compression region 12.

The bale tying mechanism differs from a conventional device only in that there is provided mechanism for catching an extra loop of slack in the loop passed around the compressed bale. The compression apparatus according to the invention in this embodiment is arranged to overcompress the straw so that upon release from the compression apparatus the bale expands slightly but thereafter constitutes a permanently formed shape. In order to allow for this slight expansion after overcompression, an extra loop of twine is caught during the tying and knotting sequence.

The device for catching the extra loop of twine is shown in plan and side view respectively in FIGS. 7 and 8. Beneath the subframe 18 and pivotally mounted on the main frame 27 are two hooks 56 and 57 which pivot about vertical axes and are biased apart by a compression spring 58. The hooks 56 and 57 are mounted on a subcarriage 59 which is movable along the length of the machine relative to the main frame 27. The hooks 56 and 57 bear outwardly against guide plates 60 and 61 and, by virtue of the compression spring 58, the hooks 56 and 57 urge the subcarriage 59 to the right in FIGS. 7 and 8 against a stop.

Upon movement of the carriage 18 of FIG. 1 to the left in FIG. 1, the carriage 18 strikes a plunger 62 which moves to the left in FIG. 7 relative to the main frame 27. As the subcarriage 59 is carried to the left by the plunger 62, the hooks 56 and 57 are moved inwardly and rearwardly and operate to catch the twines carried by the needles 32. Thus, movement of the main carriage 18 at the end of the compression stroke automatically provides a loop of slack in the twine carried by the needles 32.

Upon release of the main carriage 18 and the return stroke of the main carriage 18, the subcarriage 59 moves to the right in FIG. 7 and the hooks 56 and 57 move outwardly to release the slack loops in the twine. This is timed to occur just before or at the time when the compressed bale is being released from the end of the press framework 9 so that as the compressed bale expands the slack is taken up.

Figure 5:
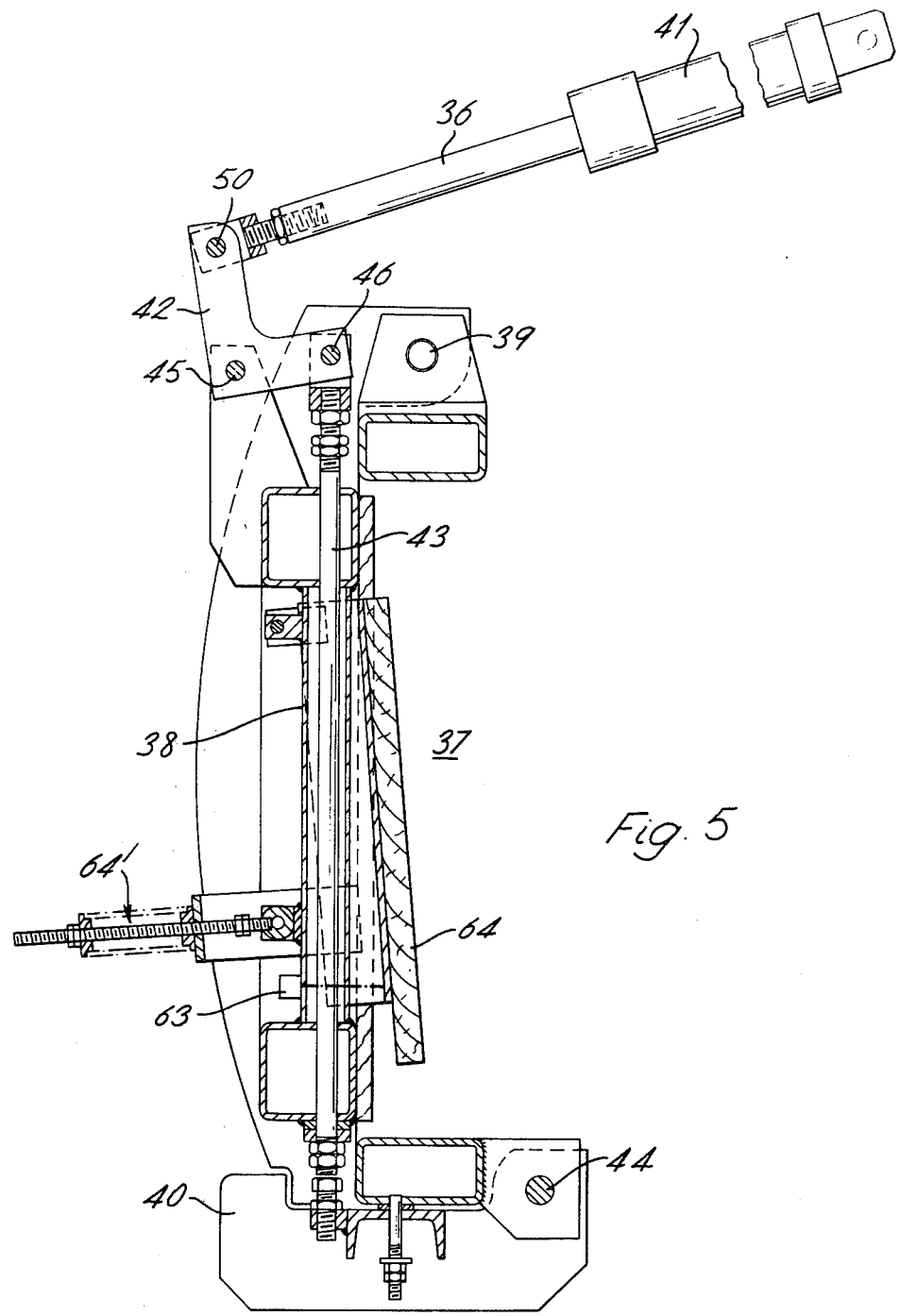
FIG. 5 is a side view partly in section of an end door of the compression apparatus shown in the preceding Figures.

As shown in detail in FIGS. 5 and 6, the end of the press framework 9 remote from the input opening 13 has an output opening 37 which is closable by an end door 38. The end door 38 is pivoted at its upper end about a door pivot 39, and is held closed at its lower end by a latch 40. The latch 40 is releasable by a ram 41 operating a pivot plate 42 which in turn drives a connecting rod 43. The pivot plate 42 is pivotable about a primary pivot 45 linking the pivot plate 42 to the door 38 and also about a secondary pivot 46 linking the pivot plate 42 to the connecting rod 43. The pivot plate 42 is linked to a pivot rod 36 of the ram 41 by a piston pivot 50.

When it is required to release the door 38, the ram 41 is actuated to move the piston rod 36 to the right in FIG. 5. While the door is held shut by the latch 40, contraction of the ram 41 pivots the plate 42 about the primary pivot 45 and produces downward movement of the rod 43. Downward movement of the rod 43 rotates the latch 40 in an counterclockwise direction about the latch pivot 44 and allows the door 38 to open. After the latch 40 has been released, continued contraction of the ram 41 now rotates the plate 42 together with the door 38 about the door pivot 39 and completely opens the door.

There is coupled between the end door 38 and the main frame 27 a sensor 63 (shown diagrammatically in FIG. 5) which is arranged to detect pressure on the end door. Before the compression stroke of the apparatus begins, a central panel 64 of the door 38 is biased to the position indicated in FIG. 5 and is in contact with a plunger (not shown) of the sensor 63. The pressure detection of the sensor 63 may be set at a relatively low level such as to detect contact on the door 38 by the precompressed column of straw from the conventional baler 10 as soon as the column has filled the compression region 12. This initial contact closes the switch 63 and triggers the start of the compression stroke.

The sensor 63 also provides a means for varying the density of the bale formed by the compression apparatus. The door 38 is biased slightly forwardly in the position shown in FIG. 5 by an adjustable spring biassing member 64'. Adjustment of the biassing member 64' varies the amount of pressure required to be applied to the door 38 before it moves back to a vertical position and triggers the sensor 63. Thus by for example increasing the spring loading on the door, there can be brought about an increase in the amount of the preformed column of straw which is driven into the compression region before the main compression by the teeth 21 takes place. It will be appreciated that with a greater amount of straw in the compression region before the main compression starts, the final bale will have a greater density.

With regard to the structure of the press framework 9 which defines the compression region 12, it will be appreciated that the press framework may be a fully enclosed bale chamber or may be a relatively open framework such as is shown in the accompanying Figures. In particular, with reference to FIG. 3, the straw to be compressed is housed essentially by side members 71 and angle section lower members 72. With long straw it is not found necessary to provide a complete floor to the press framework 9 because the material to be compressed is entered into the compression chamber 12 in the form of a preformed column of material. However it is found, in the embodiment shown, to be advantageous to provide a further angle section member 73 on each side of the compression region 12 running along the length of the press framework 9. The angle section member 73 is arranged to have one limb of its angle section projecting horizontally into the compression region 12, and during compression the preformed column travels along the member 73 so that a groove in the bale is formed by this member. The presence of the ledge or fin 73 extending into the material during compression is found to be useful in preventing buckling of the bale during compression.

It is also not found necessary to provide a roof to the press framework 9 at least for most of the length of the press framework 9. In fact during compression of the material, some slight upward movement occurs as the column of material is compressed. However it is found advantageous to provide a partial roof to the press framework 9 in the end portion 49 of the compression region 12, which constitutes the portion of the compression region 12 in which the compressed bale exists after the compression elements 21 come to the end of their stroke.

Referring to FIGS. 9 and 10 the roof members which are provided in the end portion 49 of the compression region 12 are conveniently arranged to provide a false ceiling. The roof members consist of a pair of parallel beams 74 and 75 which hang from a central upper member 76 of the press framework 9 and are pivotable on four pivot links 77 to 80 of which links 77 and 78 are seen in FIG. 10.

The roof members 74 and 75 are pivotable between three main positions in which the pivot links 77 and 78 adopt different angles.

In the first, rest position, the beams 74 and 75 hang at their lowest positions and the links 77 to 80 assume a vertical position. When a column of straw begins to be compressed in the compression region 12, the roof beams 74 and 75 move upwardly and rearwardly until an adjustable end stop 75' comes into contact with the end door 38. The roof beams 74 and 75 stay in this second position for the remainder of the compression stroke. Upon opening of the door 38 after the compressed bale has been formed, the roof beams 74 and 75 are released to move upwardly and rearwardly until they are alongside the main roof member 76.

The purpose of this false ceiling provided by the roof members 74 and 75 is two-fold. Firstly during the initial compression of the straw the slight movement allowed in the roof beams allows a better positioning of the straw and a more uniform formation of the bale and avoids buckling. Secondly, upon release of the door 38 the relaxation of the roof beams 74 and 75 allows a slight expansion of the compressed bale from the original overcompressed state. As has been explained, a certain amount of slack is allowed in the twine tying the bale to allow for this expansion from overcompaction. As a result of this slight expansion, the bale can be ejected much more easily from the end of the press framework than would be the case if it were wedged into a fixed end portion 49 of the press framework 9.

Final ejection of the compressed bale from the press framework 9 is achieved in the embodiment shown in two stages. Firstly the oncoming column of straw which enters the compression region 12 during the return stroke of the carriage 18 eventually contacts the compressed bale of straw and nudges it towards the end opening 37. As soon as this movement has begun the compressed bale comes in contact with a pair of continuously rotating sets of star wheels 81 and 82 one on each side of the press framework 9. Once these rotating star wheels 81 have gripped the bale, the bale is swiftly ejected from the rear of the compression framework 12 and as it leaves the framework it trips a microswitch (not shown) at the rear of the frame which is arranged to close a hydraulic valve to actuate the door ram 41 and swiftly close the door 38. This is accomplished before the oncoming column of straw reaches the centre panel 64 of the door 38.

There will now be described in more detail the manner of operation of the apparatus shown in the drawings. At the initial stage of the cycle, the end door 38 is closed and held shut by the latch 40. The subframe 18 is positioned at the front most part of the bale chamber 12 and a precompressed column of straw from the conventional baler 10 is passed through the input opening 13 into the compression region 12 until the column of straw makes contact with the centre panel 64 of the end door 38. This closes the sensor switch 63 which opens hydraulic valves (not shown) to actuate the main rams 25 and 26 which move the subframe 18 away from the input opening 13 along the guide tracks 20.

At the start of the cycle the teeth 21 are positioned outwardly, having previously pivoted out from the compression region 12 to allow the straw column to pass between the teeth 21. Movement of the subframe 18 rearwardly, away from the input opening 13, brings the claws 70 and 70' against the pawls 67 and 67' which causes the teeth 21 to dig into the column of straw and to tear a length of the straw column equivalent to the swept length of the compression region 12 away from the continuous column of straw. The subframe 18 is arranged to move to the left more quickly than the input of the continuous column of straw from the baler 10, and the teeth 21 compress the freed length of straw column against the end door 38.

The subframe 18 is driven along the press framework 9 until the straw column is overcompressed beyond the required size and fits into an end portion 49 of the press framework 9. At this stage the conventional needles 32 and knotters 35 operate to tie the compressed bale, this operation being triggered by a further sensor (not shown) positioned to co-operate with the subframe 18 when it reaches the end portion 49 of the press frame 9. At the end of the tying cycle, part of the tying mechanism triggers a valve which actuates the rams 25 and 26 and the subframe 18 is returned to its position at the forward end of the bale chamber 12. On this return stroke, the teeth 21 are pivoted outwardly by the incoming straw column. Also at the end of the cycle of the tying mechanism, the ram 41 is triggered by part of the tying mechanism to operate and release the end door 38 as has been explained. As the door 38 opens, the roof members 74 and 75 are enabled to move upwardly and rearwardly to release the compressed bale which is then ejected by the star wheels 81. The ram 41 returns the door 38 to its closed position, and the apparatus is then in position for a further cycle of compression when the advancing straw column again reaches the end door 38 and triggers the associated sensor 63.

It will be appreciated that although the teeth 21 have been described as entering the straw in vertical directions from above and below, a simple modification of the apparatus can be made if required whereby the teeth enter the straw by horizontal movements, the teeth entering through the sides of the press framework instead of through the roof and floor regions of the framework.

It will also be appreciated that the press framework can have cross-sectional dimensions greater or smaller than those of a conventional piston baler so as to produce bales larger than conventional bales if required. Bale density and/or size may be varied by varying the traversing distance of the compression elements. Also more than two twine needles and knotters may be deployed to tie the compressed bale.

In FIG. 11 there is shown in strictly diagrammatic form a modification of the apparatus described with reference to the preceding Figures. The purpose of FIG. 11 is to indicate the principle of the modification and it will be appreciated that various changes will be required to the remainder of the compression apparatus in order to carry the modification into effect.

Referring to FIG. 11, a plurality of compression elements comprising teeth 121 are mounted on support means on each of two opposed sides of a compression region 112 defined by a press framework 109. The support members comprise an upper cross member 122 and a lower cross member 123 joined by vertical telescopic side members 122' to form a subframe 118 in the form of a yoke around the compression region 112.

One modification illustrated in FIG. 11 is that the teeth 121 are moved into and out of the compression region 112 by a linear movement at right angles to the main compression movement of the subframe 118 along the compression region 112. This is an alternative to the pivotal movement of the teeth 21 in the preceding Figures. The linear movement of the teeth 121 in FIG. 11 may conveniently be carried out by further hydraulic rams, not shown.

Another modification illustrated in FIG. 11 is that the teeth 121 are arranged to enter into the compression region 112 until they make contact with the lower cross-member 123. During the compression of material, force is applied to the teeth 121 by both the upper and lower cross-members 122 and 123 in contrast to the cantilevered teeth 21 and 22 in the preceding Figures.

What is claimed as new and desired to be secured by Letters Patent of the United States is:

1. Compression apparatus comprising:
    a press framework providing a compression chamber for housing material to be compressed and an input region upstream of said compression chamber;
    input opening means for the introduction of material into the apparatus at that end of the input region remote from the compression chamber;
    stop means disposed at the other end of the compression chamber from the input region against which stop means the material is compressed during operation of the apparatus;
    a sub-frame mounted for movement along a substantially rectilinear line of action on which the input opening means, the input region, the compression chamber and the stop means also lie;
    an open center means associated with said sub-frame enabling the sub-frame to pass around the input region;
    at least one compression element mounted on the sub-frame and having an operative condition in which the at least one compression element projects into the compression chamber and an inoperative condition in which the at least one compression element is free to clear both the compression chamber and the input region;
    control means operable to bring the at least one compression element into its operative position; and
    drive means for moving the sub-frame along said line of action in a cycle of movement having a first stage in which the at least one compression element is moved towards the compression chamber in its operative condition, is moved along the compression chamber to compress the material, and a third stage in which the at least one compression element, in its operative condition, is returned to the position it occupied at the beginning of the first stage, the control means being effective to bring the at least one compression element into said operative condition at the beginning of the second stage.

2. Apparatus as claimed in claim 1 in which the control means engages the at least one compression element on advance of the sub-frame at the commencement of said second stage of the cycle, the engagement of the at least one compression element with the control means being such as to force the at least one compression element inwardly towards the region.

3. Apparatus according to claim 1 in which the stop means is moveable after compression of the material to allow removal of the compressed material from the compression chamber.

4. Apparatus according to claim 3 in which the stop means comprises an end door pivoted along a horizontal axis substantially at the level of the roof of the press framework and secured in place by a catch mechanism substantially at the level of the floor of the press framework.

5. Apparatus according to claim 3 in which the drive means are coupled directly between the stop means and the at least one compression element during compression of the material.

6. Apparatus according to claim 3 in which there are provided in the region of the end of the press framework remote from the input opening at least one roof member in the upper part of the compression region which is or are movable between a lower and an upper position, the or each roof member being arranged to be in the lower position when the stop means is shut, and to be movable in the upper position when the stop means is opened after complete compression of material so as to allow partial expansion of the compressed material to facilitate ejection of the compressed bale from the compression region.

7. Apparatus according to claim 1 in which the press framework has at one end an input opening for receiving material to be compressed, said input opening being arranged to receive material into the compression region by movement of the material along the same general direction as the movement of the at least one compression element during compression of the material.

8. Apparatus according to claim 1 in which the sub-frame comprises a yoke extending around the compression region.

9. Apparatus according to claim 1 in which the drive means include mounting means for moving the at least one compression element into and out of the compression region by a movement of the at least one compression element in a direction transverse to the general direction of movement of the at least one compression element during the said second stage when the material is being compressed in the compression region.

10. Apparatus according to claim 9 in which the said transverse movement is in a direction substantially at right angles to the direction of movement of the at least one compression element during the said second stage of the cycle when the material is being compressed.

11. Apparatus according to claim 1 in which the drive means include pivotal mounting means for moving the at least one compression element into and out of the compression region by a pivotal movement of the at least one compression element.

12. Apparatus according to claim 1 in which the drive means include support means on each of two opposed sides of the compression region for applying a driving force to the at least one compression element along the compression chamber during compression of material.

13. Apparatus according to claim 12 in which the at least one compression element comprises a plurality of compression elements arranged in two oppositely facing arrays extending into the compression region during the said second stage of the cycle.

14. Apparatus according to claim 1 in which the at least one compression element is positioned on each of two opposed sides of the compression region.

15. Apparatus according to claim 1, for baling crop material including means for tying into a bale each quantity of material compressed by the at least one compression element at the end of a cycle of movement of the at least one compression element.

16. Compression apparatus comprising:
a press framework defining a compression region for housing material to be compressed and an input region upstream of said compression region;
stop means disposed at the end of the compression region remote from the input region against which stop means the material is compressed during operation of the apparatus;
a sub-frame mounted for movement along a substantially rectilinear line of action on which the compression region lies forming an open center enabling the sub-frame to pass around the input region;
at least one compression element mounted on the sub-frame and having an operative condition in which the at least one compression element projects into the compression region and an inoperative condition in which the at least one compression element is free to clear both the compression region and the input region;
control means operable to bring the at least one compression element into its operative position; and
drive means for moving the sub-frame in a cycle of movement having a first stage in which the at least one compression element is moved towards the compression region, a second stage in which the at least one compression element, in its operative condition, is moved along the compression region to compress the material, and a third stage in which the at least one compression element, in its operative condition, is returned to the position such occupied at the beginning of the first stage, the control means being effective to bring the at least one compression element into said operative condition at the beginning of the second stage wherein the drive means further comprises support means on each of two opposed sides of the compression region for applying force to the compression element or elements for driving the element or elements along the compression region during compression of the material.

17. Compression apparatus comprising:
a press framework defining a compression region for housing material to be compressed:
stop means connected to said press framework against which the material can be pressed during operation;
at least one compression element for compressing material by movement along the compression region;
drive means for moving the compression element or elements in a cycle of movement having one stage in which the or each element enters into the compression region, a further stage in which the or each compression element is moved along the compression region along a substantially rectiliner path to compress material in the compression region, and a yet further stage in which the or each compression element is returned to the position it occupied at the beginning of the first-mentioned stage, the compression element or elements being at least partially removed from the compression region during the return movement in the last mentioned stage; and
means for shaping the material to be compressed into a preformed column of material and for feeding the preformed column of material into the compression region, the compression element or elements being arranged during the last mentioned stage to execute the return movement by moving past the said preformed column of material during its movement into the compression region.

18. Apparatus according to claim 17 further comprising a pressure-responsive trigger mechanism positioned to be actuated by the advancing preformed column of material and coupled to the drive means for advancing the drive means to commence the said cycle of movement when a required amount of the material has entered the compression region.

19. Apparatus according to claim 18 in which the pressure-responsive trigger mechanism is adjustable to respond to different pressures exerted by the advancing column of material in such a manner as to allow variation of the density of the material after compression by the compression elements.

20. Apparatus according to claim 18 in which the pressure-responsive trigger mechanism is coupled to said stop means.

21. Compression apparatus comprising:
a press framework defining a compression region for housing material to be compressed:
stop means connected to said press framework against solids the material can be pressed during operation;
at least one compression element for compressing material by movement along the compression region;
drive means for moving the compression element or elements in a cycle of movement having one stage in which the or each element enters into the compression region, a further stage in which the or each compression element is moved along the compression region along a substantially rectiliner path to compress material in the compression region, and a yet further stage in which the or each compression element is returned to the position it occupied at the beginning of the first mentioned stage, the compression element or elements being at least partially removed from the compression region during the return movement in the last mentioned stage; and
means for shaping the material to be compressed into a preformed column of material and for feeding continuously the preformed column of material into the compression region, the drive means being arranged to move the compression element or elements into a position between a main body of the column of material entering into the compression region and a portion of the column of material within the compression region, the compression element or elements being arranged during the said further stage to compress the said portion of material in the compression region while the main body of material continues to enter the compression region.

22. Apparatus according to claim 21 in which the compression element or elements are adapted to sever the said portion of material to be compressed from the said main body of material.

23. Compression apparatus comprising:
a press framework defining a compression region for housing material to be compressed;
stop means connected to said press framework against which the material can be compressed during operation;
at least one compression element for compressing material by movement along the compression region;
drive means for moving the compression element or elements in a cycle of movement having one stage in which the or each element enters into the compression region, a further stage in which the or each compression element is moved along the compression region to compress material in the compression region, and a yet further stage in which the or each compression element is returned to the position it occupied at the beginning of the first mentioned stage; and
means for shaping the material to be compressed into a preformed column of material and for feeding the preformed column of material into the compression region, the compression element or elements being arranged during the last mentioned stage to execute the return movement by moving past the said preformed column of material during its movement into the compressed region.

24. Compression apparatus comprising:
a press framework defining a compression region for housing material to be compressed:
stop means connected to said press framework against which the material can be compressed during operation;
at least one compression element for compressing material by movement along the compression region;
drive means for moving the compression element or elements in a cycle of movement having one stage in which the or each element enters into the compression region, a further stage in which the or each compression element is moved along the compression region to compress material in the compression region, and a yet further stage in which the or each compression element is returned to the position it occupied at the beginning of the first mentioned stage; and
means for shaping the material to be compressed into a preformed column of material and for feeding continuously the preformed column of material into the compression region, the said drive means being arranged to move the or each compression element into a position between a main body of the column of material entering into the compression region and a portion of the column of material within the compression region, the compression element or elements being arranged, during the said further stage to compress the said portion of material in the compression region while the main body of material continues to enter the compression region.

* * * * *

UNITED STATES PATENT AND TRADEMARK OFFICE
CERTIFICATE OF CORRECTION

PATENT NO. : 4,172,414
DATED : OCTOBER 30, 1979
INVENTOR(S) : WILFRED E. KLINNER ET AL.

It is certified that error appears in the above—identified patent and that said Letters Patent is hereby corrected as shown below:

Column 2, line 33, change "mechanism" to --mechanisms--.

Column 3, line 29, correct the spelling of "mechanism".

Column 4, line 11, after "provided" insert --a--; line 19, after "includes" insert --a--.

Column 5, line 17, change "are" to --is--.

Column 6, line 10, after "region," insert --a--.

Column 8, line 9, before "drive" insert --a--.

Column 9, line 26, after "provided" insert --a--.

Column 14, line 1, after "chamber" insert --, a second stage in which the at least one compression element,--; line 5, change "operative" to --inoperative--.

UNITED STATES PATENT AND TRADEMARK OFFICE
CERTIFICATE OF CORRECTION

PATENT NO. : 4,172,414
DATED : OCTOBER 30, 1979
INVENTOR(S) : Wilfred E. Klinner et al.

It is certified that error appears in the above—identified patent and that said Letters Patent is hereby corrected as shown below:

Column 15, line 51, change "operative" to --inoperative--.

Column 16, line 46, change "solids" to --which--.

Signed and Sealed this

Thirty-first Day of August 1982

[SEAL]

Attest:

GERALD J. MOSSINGHOFF

Attesting Officer    Commissioner of Patents and Trademarks